United States Patent [19]

Rayl

[11] 4,268,317

[45] May 19, 1981

[54] LIGHTWEIGHT INSULATING STRUCTURAL CONCRETE

[76] Inventor: Layton L. Rayl, 1865 S. State St., Salt Lake City, Utah 84115

[21] Appl. No.: 972,611

[22] Filed: Dec. 22, 1978

[51] Int. Cl.³ .............................................. C04B 15/02
[52] U.S. Cl. ........................................ 106/98; 106/89
[58] Field of Search ........................... 106/89, 98, 120; 427/294

[56] References Cited

U.S. PATENT DOCUMENTS

| | | | |
|---|---|---|---|
| 1,305,522 | 6/1919 | Caven | 106/98 |
| 2,250,107 | 7/1941 | Nelles | 106/98 |
| 4,002,788 | 1/1977 | Lott | 118/50 |
| 4,017,321 | 7/1977 | Reighter | 106/98 |
| 4,031,684 | 6/1977 | Shibata | 106/98 X |
| 4,105,459 | 8/1978 | Mehta | 106/98 |

FOREIGN PATENT DOCUMENTS

| | | | |
|---|---|---|---|
| 2060949 | 6/1971 | Belgium | 106/98 |

OTHER PUBLICATIONS

Rudnai, G., *Lighweight Concretes*, Hung. Acad. Sci, Budapest, 1963, pp. 93–96, 139–147.
Orchard, D. F., *Concrete Technology*, vol. 1, John Wiley & Sons, N.Y., 1973, pp. 103–105.
Lea, F. M., *Chem. of Cement & Concrete*, Edward Arnold Ltd., London, 1956, pp. 358–363, 369 & 379–393.
Johns Manville Technical Bulletin, BMM 364–Apr. 1941.

*Primary Examiner*—G. O. Peters
*Attorney, Agent, or Firm*—Schuyler, Banner, Birch, McKie and Beckett

[57] ABSTRACT

A lightweight insulative, structural concrete is produced from a cement mix containing lightweight aggregates having precisely defined physical and chemical properties. These aggregates are very low in density and very high in amorphous $SiO_2$ content. The concrete product produced using the mix of this invention has a unique combination of high structural strength (up to 3400 psi, 28-day compressive), low density (50 to 110 pounds per cubic foot) and high thermal resistance (R) values (up to 3.16/inch). Such a product is just as strong, one half the weight, and 36 times more insulative than ordinary hard rock concrete.

35 Claims, No Drawings

LIGHTWEIGHT INSULATING STRUCTURAL CONCRETE

BACKGROUND OF THE INVENTION

1. Field of the Invention

This invention relates to concrete products, and more particularly to a structural insulative lightweight concrete.

2. Description of the Prior Art

Lightweight concrete compositions per se are known in the art. Frequently this type of product is produced by formulating a concrete mix with lightweight aggregates. Among the lightweight aggregate materials which have been employed in the prior art to produce lightweight concretes are expanded shale, pumice, volcanic tuffs, sintered diatomite, blast furnace slag, sintered flyash, perlite, and vermiculite.

The lightweight concretes of the prior art employing these aggregate materials, however, have not achieved both high strength and high thermal resistance. In general, those materials possessing suitable structural strength (i.e., over 1000 psi code or 2500 psi design) have low thermal resistance (R) values, i.e., in the range of less than 1. (Hard rock concrete has an R value of 0.08.) Those lightweight concretes possessing higher R values such as perlite or vermiculite-containing materials (R=1 to 2) do not possess sufficient strength for structural use.

Applicant is aware of no lightweight concrete which has sufficient strength for structural applications and yet has a high enough thermal resistance to be a significantly insulating material. Thus, at a time when energy resources are becoming increasingly scarce, a structural lightweight concrete that is also significant in its insulative properties would be a welcome advance.

SUMMARY OF THE INVENTION

It is therefore an object of the present invention to provide a low cost building material which will result in significant energy savings through higher thermal insulative capacity.

It is also an object of the present invention to provide a novel building material which will significantly lower the cost of construction in terms of both raw materials and labor costs.

It is another object of the present invention to provide a versatile building material which can be used in place of composite structures containing as many as 3 or 4 separate building materials.

It is also an object of the present invention to provide a concrete product which has approximately one-half the density of ordinary structural concrete, which has a thermal insulative capacity 36 times that of ordinary structural concrete and which has nearly the compressive strength of ordinary structural concrete.

According to this and other objects, the present invention provides a concrete mix for making structural insulative lightweight concrete which mix comprises Portland cement and a lightweight fine aggregate having an amorphous $SiO_2$ content of at least about 50% by weight and a density of less than about 60 pounds per cubic foot.

The present invention also provides a hardened lightweight insulative cementitious product having sufficient strength for structural application, a thermal resistance (R) value of at least about 2.5/inch and a density of less than about 110 pounds per cubic foot, this cementitious product comprising lightweight aggregates of low density and high amorphous $SiO_2$ content bonded together with a hydrated Portland cement.

The present invention also relates to a method for making a precast insulative lightweight cementitious product having sufficient strength for structural applications, a thermal resistance (R) value of at least about 2.5/inch and a density of less than about 110 pounds per cubic foot, this method comprising the steps of (a) providing a concrete mix comprising Portland cement and lightweight aggregates having a low density and high amorphous $SiO_2$ content; (b) adding sufficient water to the mix to form a castable concrete mixture; (c) pouring the concrete mixture into a mold of predetermined size and configuration; (d) drawing a vacuum on the concrete mixture in the mold to remove excess free water; (e) curing the concrete mixture in the mold for a period of time sufficient to impart handling strength to the product; and (f) drying the cured concrete mixture at a temperature and for a time sufficient to remove substantially all of the free water from the product.

DESCRIPTION OF THE INVENTION

The concrete building product of the present invention possesses a unique combination of structural and insulative properties:

(1) Density: approximately half of that of conventional hard rock concrete;

(2) Compressive strength: approximately equal to that of conventional hard rock concrete;

(3) Modulus of elasticity: approximately one third that of concrete or approximately the same as wood;

(4) Resistance to rapid freezing and thawing: approximately four times better than regular concrete;

(5) Thermal transmittance:
Thermal Conductivity—k Factor=0.316 BTU-inch/Hr-$Ft^2$-°F. which corresponds to a thermal resistance (R) value of 3.16 per inch. This is approximately 36 times the resistance of conventional concrete.

As an example of the potential savings in both material and labor costs, consider an exterior wall which must meet an R-30 insulation requirement. Using conventional building materials an R-30 rated wall would have an overall thickness of 18 inches and consist of an internal course of cinder blocks, a layer of rock wool or fiberglass insulation and an exterior course of brick. The cost for this type of construction is about $9.50 per square foot. Using the concrete product of the present invention, however, an R-30 rated wall structure can be achieved by simply employing a 10 inch thick unitary structure. Employing the concrete as precast panels results in a cost of $4.50 per square foot.

The unusual combination of high strength, low density and high thermal resistance is achieved in the concrete product of the present invention by employing lightweight aggregates having particular physical and chemical properties. Broadly these aggregates are materials comprising a high percentage of amorphous $SiO_2$ and containing an extremely large percentage of air-containing porosity, i.e., very low density.

While not wishing to be bound by any particular theory applicant believes that the surprisingly high values of thermal resistance are achieved by a minute "thermopane" effect as a result of the aggregate structure which approximates numerous layers of glass separated by air spaces.

One lightweight aggregate employed according to the present invention is a finely divided material having an amorphous silica content of at least 50% by weight and a density of less than 60 pounds per cubic foot. In this fine aggregate the preferred range of amorphous $SiO_2$ content is at least 75% by weight. The closer to pure glass (100% amorphous $SiO_2$) the better the material will be.

The density of this fine siliceous aggregate should be less than about 60 pounds per cubic foot. Densities much over this value result in reduced insulation properties. At the other end of the preferred density range is a practical limit of about 20 pounds per cubic foot. If the density of the fine lightweight aggregate is much below 20 pounds per cubic foot the strength of the resulting lightweight concrete is adversely affected. More preferred are fine aggregate densities in the range of about 30 to 50 pounds per cubic foot. The most preferred density is about 40 pounds per cubic foot.

The low density of the fine aggregates employed according to the present invention results from a highly porous structure which contains from about 60 to about 85% void space. This type of material can be found in naturally occurring materials of volcanic origin, such as expanded volcanic tuffs or in other natural or man made materials.

The fine aggregate of the present invention preferably should be employed in a particle size of from about 0.001 to 1.0 mm. Preferred is a fine aggregate particle size range of from about 0.001 to 0.2 mm. Most preferred are fine aggregate particle sizes in the range of about 0.005 to 0.100 mm. It is believed that the smaller particle size as contemplated by the present invention positively contributes to the structural strength of the resulting concrete products.

One fine aggregate material suitable for the practice of the present invention will now be described. This material is an expanded volcanic tuff which is used in its naturally occurring finely divided form as found in deposits in central Utah. This material has a density of about 39 pounds per cubic foot and a relatively uniform particle size of approximately 0.005 to 0.100 mm. This fine aggregate material has a porosity of about 65 to 75% void space and the following composition (by weight):

| | |
|---|---|
| $SiO_2$ (amorphous) | 79.9% |
| $Fe_2O_3$ | 4.8% |
| $(CaAl_2Si_7)_{18} \cdot 6H_2O$ | 3.7% |
| $SiO_2$ (crystalline) | 3.1% |
| $KAlSi_3O_8$ | 2.1% |
| $TiO_2$ | 2.0% |
| $BaSO_4$ | 1.4% |

The present invention also contemplates the use of a coarse aggregate having a high amorphous $SiO_2$ content, generally of at least 50% and preferably at least 90% by weight of the aggregate. In general, the coarse aggregate should be in the particle size range of from about ⅛ inch up to about 2 inches. The preferred particle size range is from about 3/16 inch to about ¾ inch with most preferred aggregates being approximately ⅜ inch in size.

The coarse aggregates of the present invention should have a density of less than 70 pounds per cubic foot. Preferred are densities in the range of about 35 to 70 pounds per cubic foot with most preferred density range falling from about 40 to 50 pounds per cubic foot.

As in the case of the fine aggregate described above, materials of a volcanic origin are the most prevalent supply of materials having the requisite characteristics. A particularly well suited material is a crushed volcanic rock mined in central Utah. This rock has a density of about 46 pounds per cubic foot when crushed to the 3/16 to ¾ inch size range and has the following composition (by weight):

| | |
|---|---|
| $SiO_2$ (amorphous) | 94.8% |
| $CaCO_3$ | 3.1% |
| $MgCa(SiO_3)_2$ | 1.5% |
| $Fe_2O_3$ | 0.5% |

Another component of the concrete mix of the present invention is Portland cement. Any of the conventional Portland cement types, i.e., I–V or entrained air varieties thereof, can be employed according to the present invention. In addition, conventional concrete additives or modifiers such as hardeners, accelerators or retarders can be added to the cement or concrete mixture of the present invention with little adverse effect on the unique combination of properties achieved.

The proportions of the major ingredients in the concrete mix of the present invention can be varied according to the intended use of the concrete material. In general, the lower the proportion of cement the lower the overall strength of the concrete. For most applications the cement will comprise at least about 20% by weight of the mix. However, lower proportions may be used if strength requirements permit. The upper end of the cement content range of the mix is dictated by economic factors. In general, amounts much greater than 55% by weight become economically unfeasible; however, for a particular application higher cement proportions may, of course, be employed. A typical cement mix formulation for use in precast panel manufacturing comprises about 35% by weight of Portland cement.

The remainder of the cement mix formulation consists of the lightweight aggregates. The percentage of these materials may vary broadly according to the intended applications of the final product. Thus, for some applications, a product consisting entirely of fine aggregate and Portland cement is contemplated by the present invention. A minimum amount of fine aggregate in the range of about 10% by weight, however, should be employed in order to achieve suitable strength and insulating characteristics. In general, the fine aggregate comprises from about 10% to about 85% by weight of the mix. Preferred are fine aggregate additions in the range of from about 20% to about 35% by weight. The coarse aggregate can comprise from about 0 to about 70% by weight of the mix with the preferred amounts being in the range of from about 30% to about 50% by weight. A typical cement mix formulation according to the present invention which is suitable for precast panel applications comprises 35% by weight Portland cement, 26% by weight fine aggregate and 39% by weight coarse aggregate.

Having described the ingredients of the dry cement mix, the process for producing a hardened cementitious product will now be described.

In the first step of the process of the present invention the above-identified dry ingredients are mixed with sufficient water to form a castable cementitious mixture. Generally, because of the high porosity of the low density aggregates, more water than normally employed will be required. Typically, water requirements of up to about 80 gallons per square yard of product may be employed. This is approximately twice as much water as required in hard rock concrete mixes.

In the next step of the process of the present invention the water-containing concrete mix is agitated gently for a brief period of time for example with a paddle mixer or corkscrew mixer to render the mixture homogeneous. Care should be taken to avoid violent physical agitation to prevent attrition of the coarse aggregate into more dense fine products.

The agitated mixture is then poured into a suitable casting form. The mold can be of any conventional size and configuration such as those used to produce precast panels for tilt-up construction. A rubber form liner contained in the bottom of the casting form is conventionally employed to impart particular surface ornamentation to the precast panel. After the mixture has been poured into the casting form a small amount of vibration or shaking can be employed to remove air pockets. Care should be taken, however, to avoid excessive vibration as the aggregates employed according to the present invention are lighter than the water and tend to rise to the surface. Accordingly, vibration for periods of up to about 10 seconds have been found suitable.

Next, the mold containing the concrete mixture is subjected to a vacuum dewatering step to remove excess free water. It has been found that the concrete product according to the present invention does not exhibit the marked improvement in thermal resistance values unless substantially all the free water is removed from the concrete product. The vaccm dewatering step assists in this ultimate water removal and is further advantageous in that it promotes the rapid attainment of strength in the cast product. Accordingly, a panel which has been vacuum dewatered can be removed from the casting form without damage within 24 hours whereas a panel which has not been vaccm dewatered does not have sufficient strength for removal until at least 2 or 3 days after casting. The vaccm dewatering step is preferably accomplished by placing a vacuum jig over the top of the casting form and drawing a vacuum, e.g., −0.5 atmosphere on the form.

The next step in the process of the present invention comprises the air cure or hydration of the cast concrete mixture for a period of time sufficient to impart handling strength to the product. This air cure may take place at temperatures which can range from ambient temperature up to about 150° F. Preferred are curing temperatures of about 100° F. The cast product should be left to air cure for at least about 24 hours before it is dried according to the step described below. It is preferred, however, to let the product cure at temperatures up to about 100° F. for several days before subjecting the panel to the higher temperatures of the drying step. It appears that the longer the product is allowed to air cure the less effect the heat of drying has on the ultimate strength characteristics of the product.

After a suitable air cure period the precast product is dried at a temperature and for a time sufficient to remove substantially all of the free water. Suitable temperatures are from at least about 212° F. Preferably, the maximum drying temperature is about 300° F., but higher temperatures may be employed as long as no thermal degradation of the product occurs. The preferred drying temperature is about 225° F. This drying step is essential in order to achieve a product which has ultimate thermal resistance of the high values discussed above. Preferably, the heating process can be continued for a time period sufficient to drive off enough water to achieve a product in the desired density range, i.e., about 50 to 110 pounds per cubic foot. Typically, heating times of about 8 to 10 hours at 225° F. result in a suitable product. As will be readily apparent, the higher temperatures will require less time and vice versa.

The product of the above-described process is a structural lightweight insulative concrete which has a density in the range of 50 to 110 pounds per cubic foot, a thermal resistance value of at least 2.5/inch, and a 28-day compressive strength of at least 1000 psi. The preferred product of this invention has an R value of at least 3.0/inch, a density of about 60 to about 90 pounds per cubic foot, and a 28-day cure compressive strength of at least 2500 psi.

In order to insure the maintenance of this high thermal resistance value after on-site installation of the precast panel, it is advisable to coat at least any weather-facing surfaces of this concrete panel with a conventional sealant to prevent moisture regain. The sealant application may be by spray, dipping or other known coating and impregnating means. Any of the conventionally employed concrete sealants such as Thompson's Water Seal sold by E. A. Thompson Co., Inc. may be employed.

The coated product produced by the above-described invention may be used in any number of structural applications such as in the formation of structural members, i.e., beams and roof decks, or as tilt-up panels for exterior wall construction. When used in this manner, the product of the present invention provides a low-cost alternative for composite building structures comprising a plurality of components which result in marked savings of both material and labor.

The following specific example is intended to illustrate more fully the nature of the present invention without acting as a limitation on its scope.

EXAMPLE 1

A dry concrete mix was prepared by combining 211.5 pounds of type I Portland cement with 230 pounds of a coarse aggregate and 156 pounds of a fine aggregate. The coarse aggregate is a ⅜ inch uniform product which was crushed and sieved from a volcanic deposit located in central Utah. This volcanic rock has an approximate analysis as follows (by weight):

| | |
|---|---|
| $SiO_2$ (amorphous) | 94.8% |
| $CaCO_3$ | 3.1% |
| $MgCa(SiO_3)_2$ | 1.5% |
| $Fe_2O_3$ | 0.5% |

This particular volcanic material has a density of 46 pounds per cubic foot.

The fine aggregate is a powder-like naturally occurring expanded volcanic tuff having a particle size in the range of about 0.005 to 0.100 mm. This aggregate material, which is also found in central Utah, has a bulk density of about 39 pounds per cubic foot and has the following approximate analysis (by weight):

| | |
|---|---|
| $SiO_2$ (amorphous) | 79.9% |
| $Fe_2O_3$ | 4.8% |
| $(CaAl_2Si_7)_{18} \cdot 6H_2O$ | 3.7% |
| $SiO_2$ (crystalline) | 3.1% |
| $KAlSi_3O_8$ | 2.1% |

-continued

| | |
|---|---|
| TiO$_2$ | 2.0% |
| BaSO$_4$ | 1.4% |

Water was added to the mixture obtained above was added water at the rate of about 80 gallons per yard of finished product and the resulting slurry was briefly agitated in a paddle mixer. The mixed slurry was then poured into an 8'×16'×10" casting form having a rubber form liner with a fractured fin design on the surface. After about 10 seconds of vibration to remove air pockets, the concrete was vacuum dewatered under about −0.5 atmosphere and the dewatered product was set aside to cure for 24 hours at about 100° F. The cured product was then stripped from the mold and dried in a kiln for about 8 hours at 225° F. The resulting concrete product has a bulk density of about 72 pounds per cubic foot, a thermal resistance (R) value of 3.16 per inch, and a 28-day air cure compressive strength of about 3400 psi.

While certain specific embodiments of the invention have been described with particularity herein, it should be recognized that various modifications thereof will occur to those skilled in the art. Therefore, the scope of the invention is to be limited solely by the scope of the claims appended hereto.

I claim:

1. A hardened lightweight insulative cementitious product having a 28-day cure compressive strength of at least about 2500 psi a thermal resistance (R) value of at least about 2.5/inch and a density of less than about 110 pounds per cubic foot, said cementitious product comprising lightweight aggregates bonded together with a hydrated Portland cement, said lightweight aggregates comprising a lightweight fine aggregate having an amorphous SiO$_2$ content of at least about 75% by weight, a density of less than about 60 pounds per cubic foot, and from about 60 to about 85% by volume of void space.

2. A product according to claim 1 wherein said cementitious product is a precast structural member.

3. The product of claim 1 wherein said product is a precast panel.

4. The product of claim 1, 2 or 3 additionally comprising a coarse aggregate.

5. The product of claim 4 wherein said fine aggregate is an expanded volcanic tuff.

6. The product of claim 4 wherein said fine aggregate has a density of from about 30 to about 50 pounds per cubic foot.

7. The product of claim 4 wherein said coarse aggregate has a density of from about 40 to 50 pounds per cubic foot.

8. The product of claim 4 wherein said fine aggregate has an amorphous SiO$_2$ content of about 80% by weight and a density of about 40 pounds per cubic foot, and said coarse aggregate has an amorphous SiO$_2$ content of about 95% by weight and a density of about 45 pounds per cubic foot.

9. The product of claim 8 wherein said fine aggregate has the following composition (by weight):

| | |
|---|---|
| SiO$_2$ (amorphous) | 79.9% |
| Fe$_2$O$_3$ | 4.8% |
| (CaAl$_2$Si$_7$)$_{18}$ . 6H$_2$O | 3.7% |
| SiO$_2$ (crystalline) | 3.1% |
| KAlSi$_3$O$_8$ | 2.1% |
| TiO$_2$ | 2.0% |
| BaSO$_4$ | 1.4% |

10. The product of claim 9 wherein said coarse aggregate has the following composition (by weight):

| | |
|---|---|
| SiO$_2$ (amorphous) | 94.8% |
| CaCO$_3$ | 3.1% |
| MgCa (SiO$_3$)$_2$ | 1.5% |
| Fe$_2$O$_3$ | 0.5% |

11. The product of claim 5 wherein said expanded volcanic tuff has a particle size of from about 0.001 to 1.0 mm.

12. The product of claim 4 wherein said coarse aggregate is made from a material of volcanic origin.

13. The product of claim 12 wherein said course aggregate has a particle size from about ⅛ inch to about 2 inches.

14. The product of claim 4 wherein said fine aggregate has a density of from about 20 to about 60 pounds per cubic foot.

15. The product of claim 4 wherein said coarse aggregate has a density of less than about 70 pounds per cubic foot and an amorphous SiO$_2$ content of at least about 50% by weight.

16. The product of claim 4 wherein said coarse aggregate has a density of from about 35 to about 70 pounds per cubic foot and an amorphous SiO$_2$ content of at least 90% by weight.

17. The product of claim 5 wherein said expanded volcanic tuff has the following composition (by weight):

| | |
|---|---|
| SiO$_2$ (amorphous) | 79.9% |
| Fe$_2$O$_3$ | 4.8% |
| (CaAl$_2$Si$_7$)$_{18}$ . 6H$_2$O | 3.7% |
| SiO$_2$ (crystalline) | 3.1% |
| KAlSi$_3$O$_8$ | 2.1% |
| TiO$_2$ | 2.0% |
| BaSO$_4$ | 1.4% |

18. The product of claim 1, 2 or 3 wherein said density is from about 50 to 110 pounds per cubic foot.

19. The product of claim 1, 2 or 3 where said thermal resistance (R) value is at least about 3.0/inch.

20. A method for making a precast, insulative, lightweight cementitious product having a 28-day cure compressive strength of at least about 2500 psi, a thermal resistance (R) value of at least about 2.5/inch and a density of less than about 110 pounds per cubic foot, said method comprising the steps of:
(a) providing a concrete mix comprising Portland cement and lightweight aggregates said lightweight aggregates comprising a lightweight fine aggregate having an amorphous SiO$_2$ content of at least about 75% by weight, a density of less than about 60 pounds per cubic foot, and from about 60 to about 85% by volume of void space.
(b) adding sufficient water to said mix to form a castable concrete mixture;
(c) pouring said concrete mixture into a form of predetermined size and configuration;
(d) drawing a vacuum on said concrete mixture in said form to remove excess free water;

(e) curing said concrete mixture in said form for a period of time sufficient to impart handling strength to said product; and (f) drying said cured concrete mixture at a temperature and for time sufficient to remove substantially all of the free water in said product.

21. The method of claim 20 wherein said concrete mixture is cured for a period of at least about 24 hours at a temperature of from ambient to about 150° F.

22. The method of claim 20 wherein said concrete mixture is dried at a temperature of from about 212° F. to about 300° F.

23. The method of claim 20 additionally comprising the step of impregnating at least one surface of the dried concrete mixture with a concrete sealant.

24. The method of claim 23 wherein said surface is impregnated by spraying a sealant composition thereon.

25. The method of claim 23 wherein said surface is impregnated by dipping said surface into a sealing composition.

26. The method of claim 20 wherein said precast cementitious product is a structural member such as a beam or roof deck.

27. The method of claim 20 wherein said precast cementitious product is a panel suitable for use in tilt-up construction.

28. The method of claim 20 wherein said lightweight aggregate comprises a mixture of fine and coarse aggregates.

29. The method of claim 28 wherein said fine aggregate is an expanded volcanic tuff.

30. The method of claim 29 wherein said volcanic tuff has a particle size of from about 0.001 to 1.0 mm.

31. The method of claim 28 wherein said coarse aggregate is made from a material of volcanic origin.

32. The method of claim 31 wherein said coarse aggregate has a particle size from about ⅛ inch to about 2 inches.

33. The method of claim 28 wherein said fine aggregate has a density of from about 20 to about 60 pounds per cubic foot.

34. The method of claim 28 wherein said coarse aggregate has a density of less than about 70 pounds per cubic foot and an amorphous $SiO_2$ content of at least about 50% by weight.

35. The method of claim 28 wherein said coarse aggregate has a density of from about 35 to about 70 pounds per cubic foot and an amorphous $SiO_2$ content of at least 90% by weight.

* * * * *